3,040,059
**RECOVERY OF THE ANHYDRIDES OF POLY-
CARBOXYLIC ACIDS**
William N. Hoyte, Staten Island, N.Y., assignor to Foster
Wheeler Corporation, New York, N.Y., a corporation
of New York
Filed July 2, 1959, Ser. No. 824,552
3 Claims. (Cl. 260—346.4)

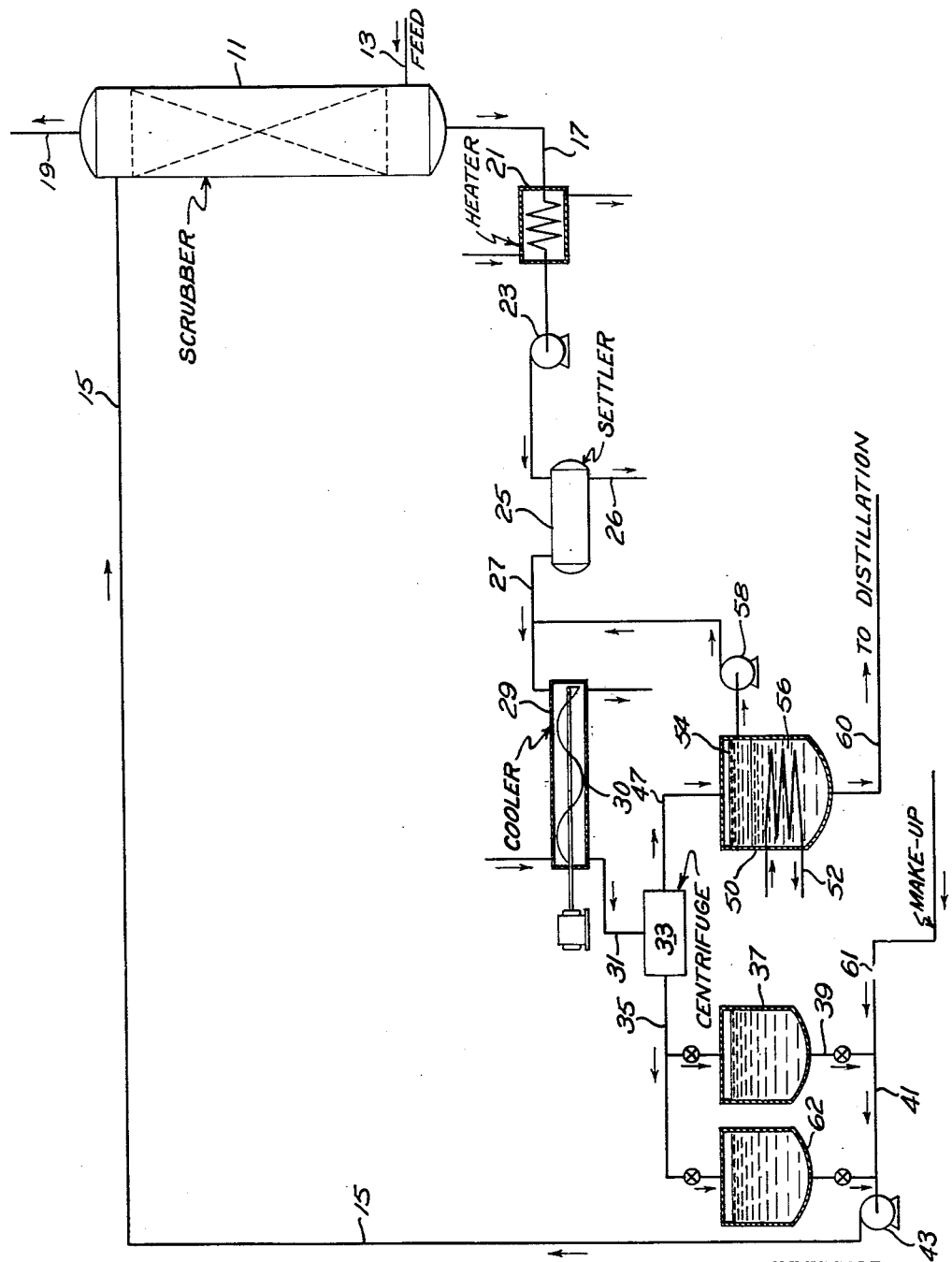

This invention relates to the recovery of the anhydrides of polycarboxylic acids and more particularly to a method for the recovery of phthalic anhydride and maleic anhydride from gaseous mixtures containing the anhydrides in the vapor phase.

Anhydrides of polycarboxylic acids, notably phthalic anhydride and maleic anhydride are obtained by passing a charge material mixed with oxygen through a catalyst at certain temperatures and pressures. The charge materials to produce phathalic anhydride are usually either naphthalene or ortho xylene; for maleic anhydride the charge material is usually benzene. The supply of oxygen is usually obtained from atmospheric air. It is found that the reaction occurs under favorable conditions when an excess of oxygen is present in the reaction zone, that is, more oxygen than is required by the oxidation reactions represented by the formulae:

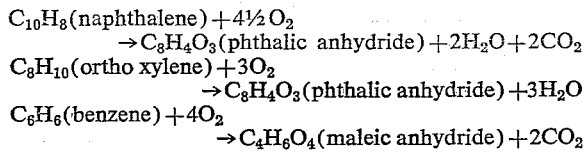

In each reaction, in practice, in addition to the above products a certain amount of the charge material oxidizes to form $CO_2$ and water in vapor form, and also tar consisting of high boiling point material formed by side reactions for which no chemical formula can conveniently be given.

The product from a reactor in which anhydrides of polycarboxylic acids are formed thus consists of: anhydride, tar in small quantities, nitrogen, oxygen, carbon dioxide, water and inert gases present in air such as argon, etc.

According to the conditions of the reaction, substances such as naphthaquinone, anthraquinone and similar compounds may also be present. For purposes of illustration, the composition of the stream of material emerging from the reactor is confined to the seven items listed above, and the anhydride is limited to phthalic anhydride.

Reaction temperatures are usually in the range of 700° F. to 900° F. and the pressure is less than 20 pounds per square inch; all components of the stream being in the form of vapor at the temperature and pressure of the system. The vapors are cooled by heat exchange in tubular equipment in which water is vaporized to form steam by heat imparted by the vapors. In cooling the vapor to a temperature in the region of 270° F. to 400° F. small quantities of tar are deposited in liquid droplet form and the droplets of tar are carried forward with the stream of vapors. In certain instances, equipment is installed to allow the tar to accumulate and to be drawn off but in any case only partial deposition of the tar occurs in this fashion. On cooling the stream of vapors still further to a temperature of 100° F. to 140° F. phthalic anhydride is deposited in the form of crystals which may vary in size from microscopic needles to large crystals, dependent on the rate of cooling of the vapors. The dew point of the vapors with respect to water is calculable for any composition of reactor vapors. It is found in practice that by cooling the stream of vapors to a temperature slightly above the temperature of the dew point with respect to water present in the vapors, almost all the phthalic anhydride present passes from the vapor phase to the solid phase.

Various cooling devices are used to permit the solid crystals of phthalic anhydride to separate substantially completely from the stream of vapors. Barns or hay boxes consisting of chambers, usually metallic, have been widely used and in these chambers the heat withdrawn from the vapors is lost by the walls, roof and floor to the atmosphere. In other instances, tubular cooling elements are installed in chambers and coolants as for example water or oil, are used in the elements. In all such cooling devices crystals of phthalic anhydride together with tar are deposited on the cooling surface. When the surface becomes thickly coated with phthalic anhydride the cooling device is taken "off line" and the stream of vapors is diverted to pass through a relatively clean cooling device. The cooling device which has been taken "off line" is emptied of phthalic anhydride and tar either by mechanically dislodging the crystals from the cooling surface, or, when tubular cooling elements are used, the coolant in the tubes is replaced by a heating medium such as steam or hot oil at a suitable temperature; the phthalic anhydride crystals and tar are thus melted and flow from the tubular elements to be withdrawn from the cooling device as a liquid.

The above described cooling devices, although widely used in the industry are based on batch operation entailing switch-over equipment and have other disadvantages.

Cooling devices or systems using the direct contact of a coolant liquid with the reactor vapors in a scrubber over the range of temperatures through which phthalic anhydride and tar are almost completely deposited have been installed and operated. One such system employs water as the coolant and the phthalic anhydride is converted to phthalic acid. The acid is separated from the water, in which it is only slightly soluble and the water is recirculated to the cooling device or scrubber, while the phthalic acid is converted at a suitable temperature to phthalic anhydride. Such a system however, requires special corrosion resistant material to be used for its components, and also requires an additional plant for converting phthalic acid to the anhydride. In view of the foregoing, it is desirable to employ a coolant which does not react chemically, as does water, with phthalic anhydride. Such coolants have been described and used.

An object of the present invention is to provide a novel and highly efficient and inexpensive method for the recovery of anhydrides of polycarboxylic acid from gaseous mixtures in a continuous fashion.

Another object is to provide a novel method wherein a coolant is used for effecting condensation of anhydrides of polycarboxylic acids by direct contact with vapors; the coolant when brought into equilibrium with the molten anhydride exhibits partial miscibility therewith.

A further object is to provide a method wherein the coolant exhibits chemical stability during the process and retains partial miscibility with the molten anhydride.

Still another object of the present invention is to provide a coolant which has the properties of not reacting chemically with the anhydrides; possesses a low specific gravity compared with the anhydride both in crystal form and in liquid or molten form; possesses a boiling range or boiling point which is appreciably higher than that of the anhydride; and at temperatures below the melting point of the anhydrides a low solubility of the anhydride in the coolant is exhibited.

A certain phase relationship known as partial miscibility is found to exist in the liquid state between anhydrides of polycarboxylic acids and other liquids. The phenomenon of partial miscibility is well known in physical chemistry. When two liquids A and B are taken at a given temperature and pressure and liquid B is added progressively to a given quantity of liquid A, liquid B may be miscible in all proportions with liquid A. However, in certain cases during the addition of liquid B, liquid A becomes saturated with respect to liquid B. On further addition of liquid B, two liquid phases appear, one of which is preponderantly liquid A saturated with respect to liquid B; the other is preponderantly liquid B saturated with respect to liquid A. The two liquid layers are known as "conjugate solutions." Typical examples are water-phenol and aniline-water. If the same procedure is followed at a temperature below the melting point of B but above the melting point of A then, during the addition of solid B to liquid A, the latter becomes saturated at a certain point in the procedure with respect to B, and any further additions of B causes solid B to remain in equilibrium with the solution of liquid A saturated with respect to B.

In accordance with the present invention a gaseous reaction mixture from a reactor containing the anhydride of polycarboxylic acid is contacted with a liquid coolant which exhibits partial miscibility with the condensed liquid anhydride. The liquid mixture of coolant and anhydride resulting from this contact is then cooled to produce a slurry of anhydride crystals and a mother liquor which is a saturated solution of the anhydride in the coolant. The slurry is subjected to a separation step which results in a clarified mother liquor and a cake of crystals of the anhydride admixed with mother liquor which is retained in the interstices of the crystals. The clarified mother liquor is recycled to the condensing operation for use in direct contact with the gaseous reaction mixture while the cake is subjected to a melting step wherein the phenomenon of partial miscibility occurs to produce two liquid phases, one of which is coolant saturated with respect to the anhydride and the other is anhydride saturated with respect to the coolant. The said other liquid phase is subjected to distillation from which the anhydride is obtained as an overhead distallate product in the required purity.

Liquid coolants exhibiting the desired properties for the present invention are the substantially pure normal paraffin hydrocarbons known as paraffin wax having the generic formula $C_nH_{2n+2}$ where "$n$" is between 20 to 25, and tetra alkyl silicates such as di-ethyl di-hexyl silicate and di-ethyl di-butyl silicate. The following tabulation provides the basic data on the three liquids with regard to solubility.

| Liquid Coolant | Paraffin Wax | Tetra(Di-Ethyl Di-Hexyl) Silicate | Tetra(Di-Ethyl Di-Butyl) Silicate |
| --- | --- | --- | --- |
| Solubility of anhydride in liquid coolant: | | | |
| At 100° F | | 0.36 | 0.41 |
| At 150° F | 0.73 | | |
| At 275° F | 7.3 | 12.2 | 12.8 |
| Solubility of liquid coolant in anhydride at 275° F | 3.88 | 7.86 | 9.55 |

The particular features and advantages which characterize the present invention will be understood from the following description when considered in connection with the accompanying drawing in which the single FIGURE shows a flow diagram of the invention.

Referring now to the drawing, the invention will be described in connection with the specific application of the process to the recovery of phthalic anhydride by the use of paraffin wax as the coolant.

Vapors from a reactor (not shown) wherein catalytic oxidation of a material as for example naphthalene or ortho xylene or other charge material takes place, are charged to the base of a scrubber vessel 11 through a line 13 after being precooled by cooling means (not shown) to a temperature of approximately 280° F. The vapors from the reactor have the following composition:

|  | Percent by weight |
| --- | --- |
| Low boiling point by-products | 0.29 |
| Phthalic anhydride | 3.03 |
| Nitrogen, argon, etc. | 72.85 |
| Oxygen | 16.78 |
| Water | 2.62 |
| Carbon dioxide | 4.28 |
| Tar insoluble in coolant | 0.10 |
| Tar soluble in coolant | 0.05 |
|  | 100.00 |

Scrubber vessel 11 operates at about 2 to 4 p.s.i.g. and contains suitable vapor-liquid contact means as for example ring packing, and has a line 15 connected to the top of the vessel to introduce a liquid coolant as for example paraffin wax containing a suitable anti-oxidant. The paraffin wax used as a coolant has the following properties:

| | |
| --- | --- |
| Melting point ° F | 122 to 124 |
| Specific gravity at 150° F | 0.7724 |
| Viscosity at 150° F secs | 43.1 |

TBP distillation at 10 mm. Hg:

| | |
| --- | --- |
| IBP ° F | 396 |
| 10% ° F | 436 |
| 20% ° F | 445 |
| 30% ° F | 454 |

Solubility of phthalic anhydride in paraffin wax at:

| | |
| --- | --- |
| 150° F percent | 0.73 |
| 200° F do | 1.87 |
| 250° F do | 4.80 |
| 275° F do | 7.3 |

The liquid wax enters scrubber 11 at a temperature of approximately 130° F. and contains 0.5% by weight of phthalic anhydride in solution. The liquid wax passes downwardly through the vapor-liquid contact means in intimate contact with the ascending vapors which are denuded of almost all the phthalic anhydride and tar; the other constituents of the vapor from the reactor being left in vapor form. The vapors in scrubber vessel 11 discharge therefrom through a line 19 at a temperature of approximately 132° F. and the cooling of such vapors in the vessel is controlled so that water is not deposited therein. The wax is raised in temperature owing to the transfer of heat from the vapors and the flow of wax to the scrubber is controlled so that its temperature is raised to approximately 215° F. on reaching the base of the scrubber. The composition of the material in the base of the scrubber is molten wax saturated with respect to both phthalic anhydride and tar, a small quantity of phthalic anhydride in crystalline form, and tar. It is immaterial to the present invention whether the anhydride is all dissolved in the wax or whether a saturated solution is formed leaving some of the anhydride in the form of crystals. The tar, however, is slightly soluble in the coolant and only a portion of it dissolves in the coolant leaving the remainder undissolved.

The material in the base of scrubber 11 leaves the latter by way of line 17 and enters a conventional tube and shell type heater 21 in which the temperature of the material is raised sufficiently by a heating fluid as for example steam to a temperature of approximately 250° F. to obtain complete solution of the phthalic anhydride in the wax and the tar becomes a limpid liquid. The stream of liquid leaving heater 21 is conducted by a pump 23 to a settler vessel 25 from which tar, which is insoluble in wax, is drawn through line 26. In settler 25, the liquid wax disengages from the tar and contains phthalic anhydride and a small quantity of tar in solution. The stream of settled liquid from settler 25 is conducted through a line 27 to a heat exchanger 29 having a scraper member 30 and the exchanger is supplied with a cooling medium as for example water, for reducing the temperature of the stream of liquid wax to approximately 130° F. The stream of liquid deposits both phthalic anhydride and solid wax on the water cooled walls of exchanger 29 in the latter stages of its cooling owing to the decrease of solubility of the anhydride and tar in the coolant with decrease in temperature. The end material emerging from exchanger 29 consists of a slurry of crystals of the anhydride containing tar and a mother liquor which is a saturated solution of the anhydride in the coolant containing negligible tar. Specifically, the stream of materials leaving exchanger 29 consists of about 97% by weight molten wax and 3% by weight phthalic anhydride in crystalline form, and tar. The molten wax contains about 0.5% by weight phthalic anhydride in solution.

A line 31 conducts the stream of materials from exchanger 29 to separation apparatus 33 as for example a centrifuge, wherein advantage is taken of the differential specific gravity between the mother liquor and the crystals of the anhydride containing tar to effect a separation. Owing to the differential specific gravity most of the mother liquor can be obtained completely free from crystals of the anhydride by a centrifuge or other equipment but owing to the crystallographic form of the crystals, which are needle shaped, an appreciable quantity of the mother liquor is held between the interstices of the crystals. The wax or mother liquor in centrifuge 33 is freed from the crystalline phthalic anhydride and leaves by line 35, whence it enters a balance tank 37 where it is maintained at a temperature of approximately 130° F. by heating means, not shown. From tank 37 the wax flows by way of lines 39 and 41 to a pump 43 which recycles the wax by way of line 15 to the top of scrubber vessel 11. The crystalline phthalic anhydride and tar is obtained from centrifuge 33 as a cake in which molten wax is held in the interstices of the crystals. The composition of the cake is approximately 25% by weight wax, 74% phthalic anhydride crystals and 1% tar.

The cake of phthalic anhydride, wax and tar is conducted from centrifuge 33 by way of a line 47 to a melting tank 50 which is provided with heating means 52 whereby the cake is brought to a temperature of approximately 275° F. The cake melts at a temperature somewhat below 275° F. and at this temperature the molten constituents exhibit partial miscibility. Accordingly, two liquid phases are produced which include an upper layer 54 consisting predominantly of wax in which 8% phthalic anhydride is in solution and a lower layer 56 consisting predominantly of phthalic anhydride and tar in which about 3% of wax is in solution. Upper layer 54 is conducted by a pump 58 to line 27 where it flows in admixture with main stream of solution of phthalic anhydride in wax flowing from settler vessel 25 to heat exchanger 29; the proportion of the stream handled by pump 58 to that leaving settler 25 being approximately 1 to 100 by weight. Lower layer 56 discharges from melting tank 50 by way of a line 60 to distillation equipment (not shown) in which phthalic anhydride is separated in the required degree of purity from the tar and the wax.

Make-up wax enters the circulation system by way of line 61 as required.

After a certain length of time the wax in circulation becomes oxidized sufficiently to necessitate discarding that in circulation in the system. A quantity of fresh liquid wax and anti-oxidant is provided in a tank 62 which is connected in parallel with tank 37 and in series with centrifuge 33. At the appropriate time, the tank 37 is taken off stream and tank 62 put on stream to provide fresh wax and anti-oxidant.

The present invention has been described in detail in connection with a specific application of the recovery process as to phthalic anhydride. It should be understood, however, that the subject process is readily applicable to the recovery of maleic anhydride in that the latter behaves in similar fashion with regard to partial miscibility in the coolant.

Inasmuch as changes may be made in the form, location and arrangement of the several parts of the invention without departing from the process thereof it will be understood that the invention is not limited except by the scope of the appended claims.

What is claimed is:

1. A method of recovering the anhydrides of polycarboxylic acids selected from the group consisting of maleic anhydride and phthalic anhydride from a gaseous mixture produced by the reaction of oxygen with a charge material selected from a class consisting of napthalene, orthoxylene and benzene in the presence of a suitable catalyst, comprising the steps of, scrubbing the gaseous mixture with a liquid hydrocarbon coolant having the formula $C_nH_{2n+2}$ wherein "$n$" is within the range of 20 to 25 and the structure is normal to form a mixture of coolant and anhydride wherein the liquid coolant at temperatures above the melting point of the anhydride exhibits partial miscibility with the anhydride, cooling said last-mentioned mixture to produce a slurry of anhydride crystals and a saturated solution of the anhydride in the coolant, separating said slurry into a saturated solution of the anhydride in the coolant and a cake of anhydride crystals admixed with the coolant, melting said cake to produce a first liquid phase of coolant saturated with respect to anhydride and a second liquid phase of anhydride saturated with respect to the coolant, and distilling the second liquid phase to obtain the anhydride in the required purity therefrom.

2. A process for recoving the anhydrides of polycarboxylic acids selected from the group consisting of maleic anhydride and phthalic anhydride from a gaseous mixture produced by contacting oxygen with a charge material selected from a class consisting of naphthalene, orthoxylene and benzene in the presence of a suitable catalyst and comprising the steps of, scrubbing the gaseous mixture with a liquid coolant selected from a group consisting of di-ethyl di-hexyl silicate, di-ethyl di-butyl silicate and paraffin wax to form a mixture of coolant and anhydride wherein the coolant at temperatures above the melting point of the anhydride exhibits partial miscibility with the anhydride, cooling the last-mentioned mixture to produce a slurry of anhydride crystals and a saturated solution of the anhydride in the coolant, separating the slurry into a saturated solution of the anhydride in the coolant and a cake of anhydride crystals admixed with the coolant, melting the cake to produce a first liquid phase of coolant saturated with respect to the anhydride and a second liquid phase of anhydride saturated with respect to the coolant, and distilling the second liquid phase to obtain anhydride in the required purity therefrom.

3. A method of recovering phthalic anhydride from a gaseous mixture produced by contacting oxygen with naphthalene in the presence of a suitable catalyst, the steps comprising, scrubbing the gaseous mixture at a temperature of between 280 F. and 300° F. with a liquid hydrocarbon coolant having the formula $C_nH_{2n+2}$ wherein "$n$" is within the range of 20 to 25 and which structure is normal at a temperature of approximately 130° F. to form a mixture of coolant and anhydride at a temperature of approximately 215° F. and wherein the liquid coolant at temperatures above the melting point of the anhydride exhibits partial miscibility with the anhydride, cooling said last-mentioned mixture to a temperature of approximately 130° F. to produce a slurry of anhydride crystals and a saturated solution of the anhydride in the coolant, separating said slurry into a saturated solution of the anhydride in the coolant and a cake of anhydride crystals admixed with coolant, heating said cake to a temperature of approximately 275° F., to melt same and produce a first liquid phase of coolant saturated with respect to the anhydride and a second liquid phase of anhydride saturated with respect to the coolant, and distilling the second liquid phase to obtain the anhydride in the required purity therefrom.

References Cited in the file of this patent

UNITED STATES PATENTS

| | | |
|---|---|---|
| 1,301,388 | Conover | Apr. 22, 1919 |
| 2,129,166 | Crowell | Sept. 6, 1938 |
| 2,134,531 | Punnett | Oct. 25, 1938 |
| 2,140,140 | Punnett | Dec. 13, 1938 |
| 2,555,287 | Hadden | May 29, 1951 |
| 2,574,644 | Landau | Nov. 13, 1951 |
| 2,942,005 | Brown et al. | June 21, 1960 |